United States Patent [19]

Black

[11] Patent Number: 4,706,276
[45] Date of Patent: Nov. 10, 1987

[54] ARRANGEMENT FOR TRANSFERRING DATA TO A CENTREX

[75] Inventor: James B. Black, Phoenix, Ariz.

[73] Assignee: GTE Communication Systems Corporation, Phoenix, Ariz.

[21] Appl. No.: 813,186

[22] Filed: Dec. 24, 1985

[51] Int. Cl.$^4$ .............................................. H04M 3/42
[52] U.S. Cl. ..................................... 379/242; 379/229
[58] Field of Search .............. 379/242, 229, 230, 231, 379/232, 233, 234, 260

[56] References Cited

U.S. PATENT DOCUMENTS 4,254,304  3/1981  Fulghum et al. .................... 379/353

Primary Examiner—James L. Dwyer
Attorney, Agent, or Firm—Anthony Miologos; Peter Xiahros

[57] ABSTRACT

An arrangement for tranmitting data messages between a remotely located attendant console and a CENTREX equipped central office exchange. The arrangement includes an operating unit residing in an interface circuit connected between the attendant console and the central office exchange. The operating unit of the present invention includes receiving circuitry connected to the attendant console and to a controller. The receiving circuitry is arranged to receive a data message from the attendant console and set a receive signal. A state machine called by the controller transfers the first byte of the data message to a temporary memory and resets the receive signal. The state machine accepts all additional characters from the receiving circuitry storing received characters in the memory until a character sequence is received indicating the end of the data message. When a complete data message is received an analysis is called by the controller which analyzes the received data message. Sequential memory receives and stores the data message from the memory responsive to the analysis concluding that the data message is for the peripheral processor. The controller then sends a control signal to the CENTREX via the sense field indicating a data message has been stored in the sequential memory and is available for transfer.

10 Claims, 7 Drawing Figures

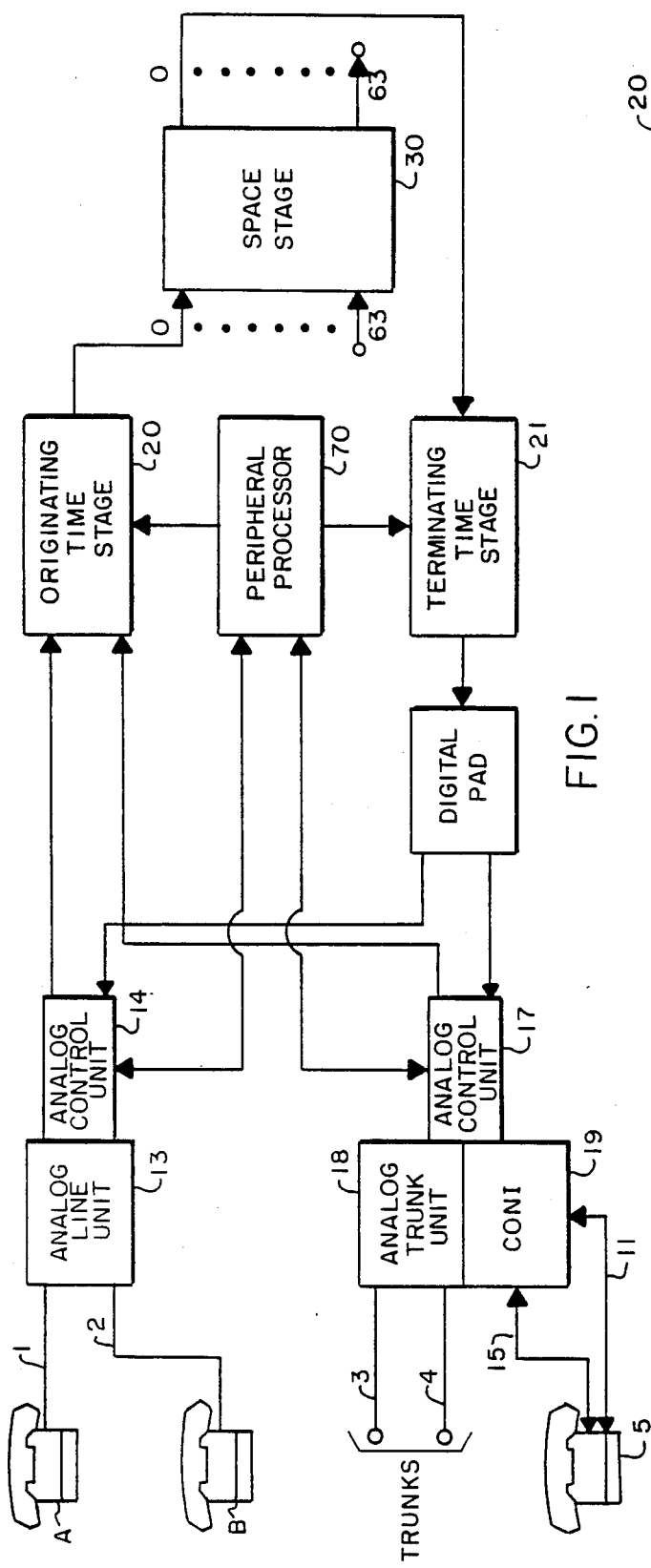
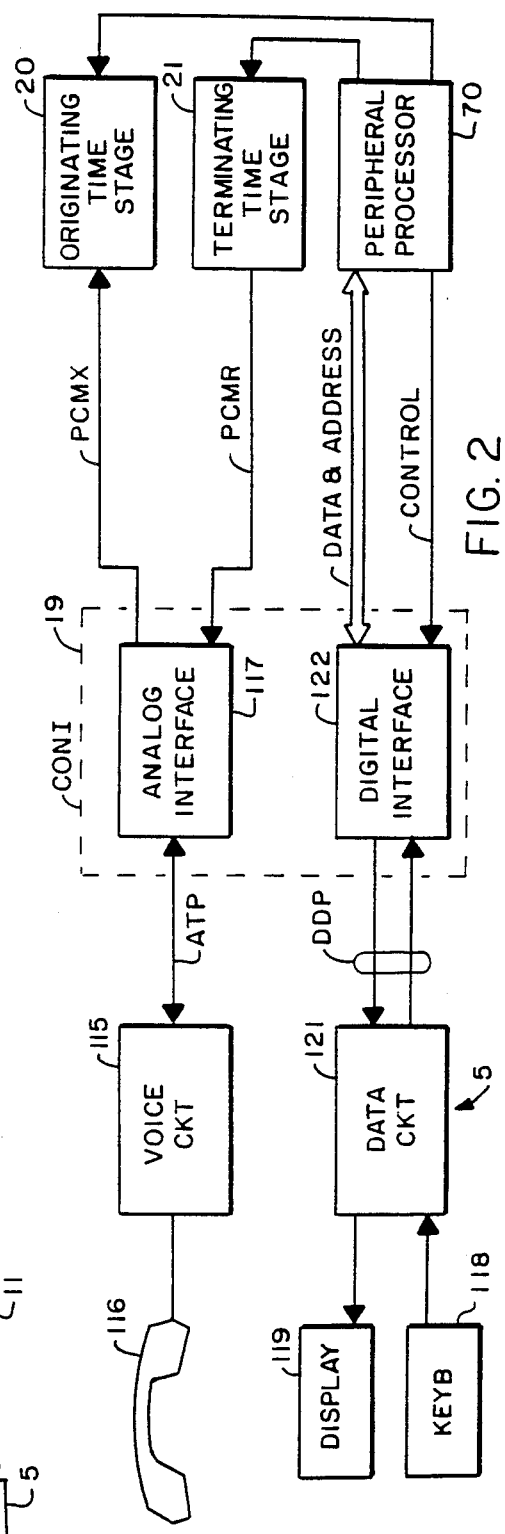
FIG.1
FIG.2

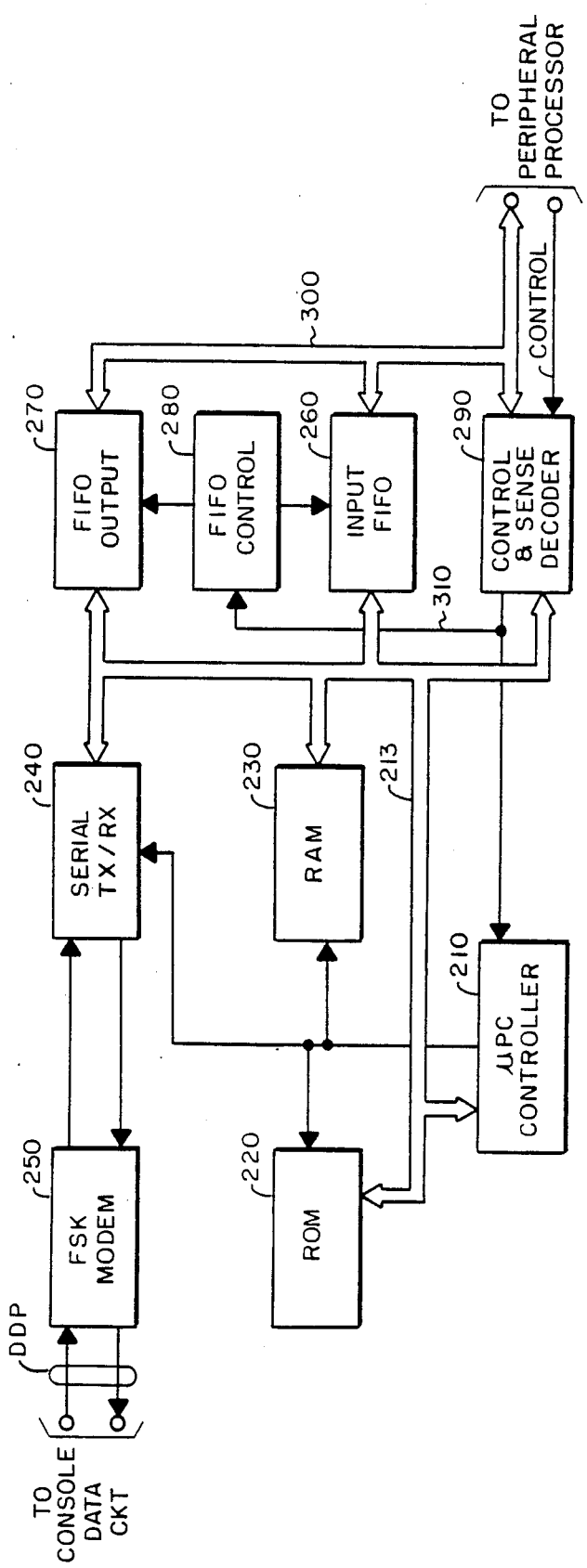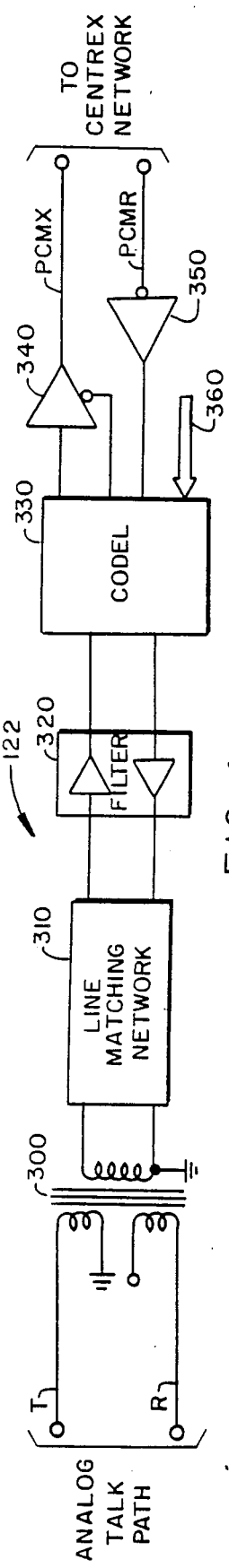
FIG. 3
FIG. 4

ARRANGEMENT FOR TRANSFERRING DATA TO A CENTREX

CROSS-REFERENCE TO RELATED APPLICATIONS

The present application is related to the following co-pending U.S. patent applications all having the same inventive entity and being assigned to the same assignee:

Ser. No. 813,322, titled, "A CENTREX ATTENDANT CONSOLE INTERFACE;"

Ser. No. 813,188, titled, "AN INTERFACE CIRCUIT FOR TRANSMITTING KEYCODES TO A CENTREX;"

Ser. No. 813,187, titled, "AN INTERFACE CIRCUIT FOR TRANSMITTING COMMAND CODES TO AN ATTENDANT CONSOLE;"

Ser. No. 813,321, titled, "CONTROL CIRCUIT FOR A CENTREX ATTENDANT CONSOLE INTERFACE;"

Ser. No. 813,185, titled, "AN ARRANGEMENT FOR TRANSFERRING DATA TO AN ATTENDANT CONSOLE;"

Ser. No. 813,176, titled, "AN ARRANGEMENT FOR INITIALIZING A CENTREX CONSOLE INTERFACE CIRCUIT."

BACKGROUND OF THE INVENTION

The present invention relates in general to telecommunication switching systems and more particularly to an interface linking voice and data communications between a CENTREX equipped central office exchange and an attendant console.

Private Branch Exchanges (PBX) are telecommunication systems which provide communication services to customers having a plurality a subscriber instruments. The PBX equipment provides a host of enhanced features such as call forwarding, intercom functions, least cost routing of calls and detailed billing. Normally the PBX is purchased by the customer and installed on premises at his location. Therefore, since the PBX handles a first level of switching among the subscriber instruments fewer central office lines are required and therefore access charges are lower. However, this savings is offset by the initial cost of the PBX equipment.

An alternative to the classical PBX is being offered in the Telecommunication market today which provides all of the features of a PBX without any of the initial costs. This system known in the field as CENTREX (central exchange) allows either a portion of a central office network switching system or a dedicated CENTREX central office network switching system to function and provide the services and features as would a dedicated PBX. The customers subscriber instruments are connected directly to the CO switch or concentrated with a multiplexing device and connected via trunk lines. The telephone operating company providing the service would service the switch therefore, alleviating the customer of maintaining his own equipment. Of course access charges are somewhat higher with the CENTREX than those with the on premises PBX equipment.

Usually PBX equipment includes an attendant console which monitors the PBX, i.e. lines or trunks in use, and provide a means of selecting or deselecting features and services as well as a system status display. Additionally, the console can also serve as a central operator station providing for attendant call handling. Such consoles are also used with CENTREX systems to provide the features discussed above.

It therefore becomes the object of the present invention to provide a console interface circuit to link an attendant console normally located at the customer premises with a CENTREX network system located at a telephone operating companies central office.

SUMMARY OF THE INVENTION

In accomplishing the object of the present invention there is provided an arrangement for transmitting data messages between a remotely located attendant console and a CENTREX equipped central office exchange. The arrangement includes an operating unit residing in an interface circuit connected between the attendant console and the central office exchange. The central office exchange includes an analog control unit connected to a peripheral processor. The analog control unit includes a control field for sending control signals to the interface circuit, and a sense field for receiving control signals and data messages from the interface circuit.

The operating unit of the present invention comprises receiving means connected to the attendant console and to controller means. The receiving means is arranged to receive a data message from the attendant console and set a receive signal signaling the controller means that a first byte of the data message has been received.

State machine means called by the controller means is arranged to transfer the first byte to temporary memory means and reset the receive signal. The state machine means accepts all additional characters from the receiving means storing the received characters in the memory means until a character sequence is received indicating the end of data message.

When a complete data message is received an analysis means is called by the controller means which analyzes the received data message to ascertain the destination of the received data message.

Sequential memory means connected to the sense field receives and stores the data message from the memory means responsive to the analysis concluding that the data message is for the peripheral processor. The controller means then sends a control signal to the peripheral processor via the sense field indicating a data message has been stored in the sequential memory. Subsequently, the peripheral processor sends the controller means a sequential memory read control signal over the control field indicating that it is reading the sequential memory means and resets the sequential memory read control signal signaling the controller means that the data message has been read.

A BRIEF DESCRIPTION OF THE DRAWINGS

A better understanding of the invention may be had from the consideration of the following detailed description taken in conjunction with the accompanying drawings in which:

FIG. 1 is block diagram of a CENTREX network system embodying the present invention.

FIG. 2 is a block diagram showing the linking paths of the present invention interface the attendant console and the CENTREX network system.

FIG. 3 is a block diagram of the digital line interface.

FIG. 4 is a block diagram of the analog line interface.

DESCRIPTION OF THE PREFERRED EMBODIMENT

Figure 5:
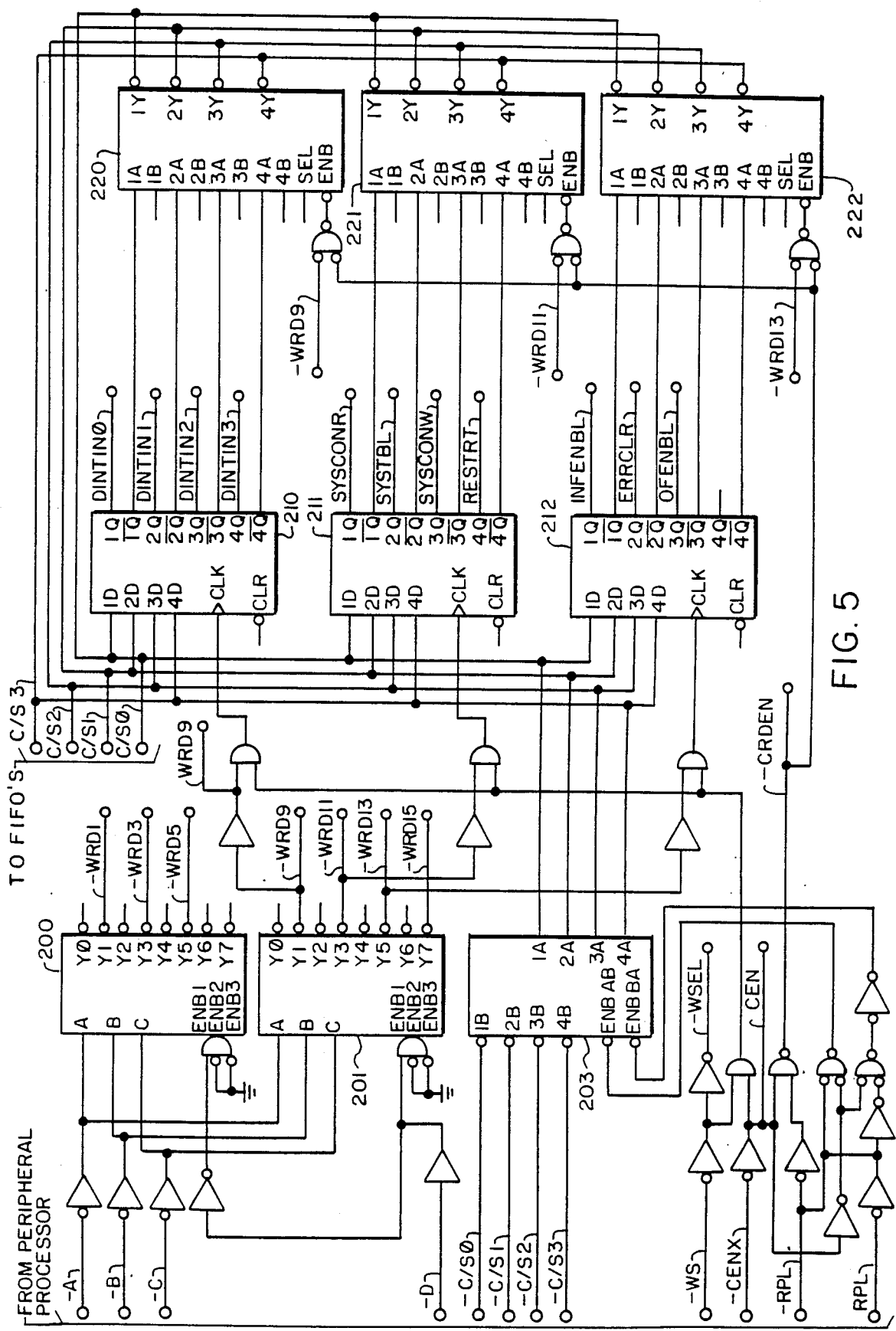
FIG. 5 is schematic of the Control and Sense Decoder shown at FIG. 3.

Referring to FIG. 1, a time-space-time digital switching system having a central exchange or CENTREX feature is shown. As a standard central office exchange telephone instruments A and B are connected to the network switching system via analog subscriber lines 1 and 2 to an analog line unit 13. The analog data received is converted to Pulse Code Modulated (PCM) digital signals for output to the next network stage. Analog line unit 13 is connected to analog control unit 14. Originating time switch 20 is connected to a space switch unit 30, which in turn is connected to a terminating time switch 21. Terminating time switch 21 is connected to analog control unit 14 and finally back to analog line unit 13 where the PCM digital signals are converted to analog signals and transmitted down subscriber lines 1 and 2.

Terminating time switch 20 is further connected to analog control unit 17, analog trunk unit 18 and trunks 3 and 4. Analog trunk unit 18 can be dedicated exclusively for CENTREX use. The trunk unit 18 connects the CENTREX customers subscriber instruments to the network system.

The Console Interface Circuit (CONI) 19 of the present invention is connected to a duplex pair of an analog control unit 17 and provides the means by which system commands, display messages and attendant console keycodes are transferred between the attendant console 5 and the CENTREX network system. The operation of the CONI circuit is transparent to both the system and the attendant console. Communication between CONI 19 and console 5 is via a digital data path 15 and an analog talk path 11.

Turning now to FIG. 2, a block diagram illustrating the interface of the attendant console to the CENTREX system is shown. The CONI interfaces the attendant console 5 and CENTREX system via two distinct communication links. In the first link, all analog signals are interfaced from the console handset 116, via voice transmission circuit 116 and analog talk path (ATP) to the analog interface 117 in the CONI 19. The analog signals are converted in the analog interface 117 into pulse code modulated (PCM) signals and transmitted to the originating time stage 20 of the CENTREX network via PCM path PCMX.

Likewise, analog information destined for the attendant console 5, is applied in PCM form to PCM path PCMX from the terminating time stage 21. The PCM information is converted into analog information by the analog interface 117 of CONI 19 and sent to handset 116 through the ATP and voice circuit 115. This communication link forms the talking path between the console 5, the CONI 19 and the network system of the CENTREX.

The data link between the console 5 and the CONI 19 is routed from a keyboard via a console data circuit 121 and a 4 wire full duplex data link (DDL) to the digital interface 122. Data input by the console operator is converted by the data circuit 121 into asynchronous data messages comprising 1 start bit, 7 data bits, an even parity bit and a stop bit. The data messages are transmitted over the DDL via a 1200 baud Frequency Shift Key (FSK) modem located in data circuit 121. The data transmitted by the console is received by the CONI 19 digital interface 122, converted into 8-bit data bytes and is processed by the CONI. The data is passed on to the network via ACU 17 to the peripheral processor 70 if no action is required by the CONI. The CONI thereby assumes a "transparent" front to the CENTREX network system and functions as a transaction exchange medium. Alternatively, in certain cases keycodes and command codes received by the CONI are acted upon and responded to by the CONI.

Data from the peripheral processor 70 in the form of command codes is transmitted to the CONI digital interface 122. Again if the data is destined only for the console the CONI formats the data into FSK asynchronous data messages and transmits the messages over the 1200 baud DDL to the console data circuit 5. The data is interpreted by the console and the appropriate display device 119 activated, i.e. LEDs turn on or off, a message displayed, the display cleared, or an audible alarm turned on or off.

Turning now to FIG. 3, a detailed explanation of the CONI digital interface will be given.

The CONI interface of the present invention is comprised of the following Large Scale Integrated (LSI) devices. A controller portion includes a microprocessor 210 connected to a Read Only Memory (ROM) 220 and Random Access Memory (RAM) 230 through an address/data bus 213. The ROM circuit 220 stores the operating system used by the microprocessor 210 which controls the operation of the CONI interface. The RAM is used as a temporary storage area for the message bytes received by the CONI. This controller portion of the CONI interface is connected to the console 5 via a serial Transmitter/Receiver (Tx/Rx) 240 and a Frequency Shift Key (FSK) modem chip 250.

The serial Tx/Rx is a LSI Universal Serial Asynchronous Receiver Transmitter (USART) such as the Intel 8259. This device under control of the microprocessor translates the 8 data bits sent to the USART on the address/data bus into the asynchronous serial data words described earlier. The FSK modem translates the data into audio tones for the transmission of the data down a twisted pair transmission path.

The connection between the CONI interface and the peripheral processor is accomplished via a pair of 64×4 First In First Out (FIFO) circuits. An input FIFO 260 and an output FIFO 270 each have one side of the FIFOs connected to address/data bus 300 which extends from the peripheral processor. Each FIFO is further connected to the CONI data bus 213. A control and sense decoder 290 is also connected to the peripheral processor address/data bus 300 and CONI address/data bus 213. The control and sense decoder interprets control words sent by the peripheral processor detailing the type of messages sent to the CONI and any special handling required. The control and sense decoder 290 also communicates to the microprocessor and a FIFO control circuit 280 via control lead 310.

As explained earlier and shown on FIG. 2 the CONI also includes an audio interface for transmitting analog voice signals between the console 5 and CENTREX network system and CENTREX network system to the console 5. The analog interface between the console 5 and the CONI consists of a single tip and ring voice pair (T and R). On this analog pair voice conversations and DTMF tones are transmitted. The system provides the talk battery on the tip and ring leads which also powers the DTMF generator in the console. The console 5 contains a standard network interface.

Turning now to FIG. 4, the analog interface of the CONI is illustrated. The interface 122 includes a two to four wire hybrid coil 300, a line matching network 310 in the form of an electrical hybrid, a transmit and receive amplifier and filter comprised of an INTEL 2912 filter and an INTEL 2910 CODEC (COder/DECoder). The hybrid coil 300 interfaces directly to the line matching network 310. The line matching network includes the necessary components for two balancing networks. This allows the use of −5 volt non-loaded lines or +12 volt loaded lines. The line matching network 310 is connected via lines TX and RX to filter network 320. The TX line connects to a transmit filter in the filter 320 as does the RX line to a receive filter. The filters also have provisions for adding the necessary gain in both the transmit and receive paths. The filter 320 is further connected via lines TX and RX to the CODEC 2910. The output of the transmit filter drives the analog input of CODEC 330. The CODECs primary function is to encode an analog signal into a 8 bit PCM word which is then sent to the network in the proper channel via driver 340 and the PCM transmit bus PCMX.

Similarly, the CODEC 330 will clock in information from the receive PCM bus PCMR and driver 350 during its assigned channel. The binary signal is then decoded into PAM (pulse amplitude modulated) signals by the CODEC and converted into an analog signal by the receive filter of filter 320. The analog signal is then applied to the console via the line matching network and the T and R leads of the hybrid coil 300. Controls signals 360 connected to the peripheral processor allows the CODEC to be programmed to operate in a specific manner i.e. transmit and receive, transmit only or operate within a specific time slot.

It should be noted since the CONI analog interface and digital interface use two distinct communication links to transmit information between the console 5 and the CENTREX network system the analog talk path and the duplex data path may be used simultaneously in transmission and reception of analog and digital data.

Before a detailed explanation of the CONI circuit is given it is believed an understanding of the message structure transmitted between the console and the CENTREX system will be helpful. The messages that are transmitted between the CONI console 5 and the CENTREX system are in an ASCII field format. All characters including numbers are transmitted as ASCII characters. The field format consists of command and data fields strung together to form a command string. This command string is treated as a single message by the console 5 or the CENTREX system. Command and data fields are separated by a "CARRIAGE RETURN" (CR). A message is terminated by a null field which is in this case a double "CARRIAGE RETURN". There is no set field length, but the maximum message length is 64 characters. Each message from the system is followed by a complementary checksum. A checksum is sent with each keycode message transmitted by console 5 or each command code transmitted by the CENTREX. The following are examples of valid command strings:

A 3 field command sent from the system to the console.

XX:MM:DDDDDDDD::C

A 2 field response sent from the console to the system.

XX:DDDDDDDD::C

In the above examples:

X=command code or keycode.
M=command code modifier.
D=command code data.
C=checksum
:="CARRIAGE RETURN" field delimiter.

All command codes, keycodes, modifiers and data are in a 7 bit ASCII format. The checksum is a 2's complement of the entire command message including the carriage return field delimiters.

Normally the data messages will carry keycodes to the CENTREX system from the console 5 or command codes from the CENTREX system to the console 5.

The CONI interface circuit communicates to the console 5 and to the CENTREX network system by accepting information from one end and transferring that information to the other. In order for this to be accomplished in the most expedient manner, the CONI uses priority structure to decide which action to take. The priority is as follows:

| PRIORITY 1 | highest | console incoming data to CONI |
| PRIORITY 2 | | console outgoing data from CONI |
| PRIORITY 3 | | CONI data from the network |
| PRIORITY 4 | lowest | CONI data to the network |

Turning now to FIG. 5, a detailed schematic of the control and sense decoder 290 is shown.

The control and sense decoder interfaces the CONI and CENTREX peripheral processor. The circuit is comprised of control point decoders 200 and 201, data transceiver 203, flip-flops 210–212 and data selectors 220–222. In addition, a number of logic gates are used to provide decoding of various read, write and enable control signals.

Decoders 201 and 202 have their inputs connected to the analog control unit (ACU) 17 which is connected to the peripheral processor 70. In all cases the CONI communicates to the peripheral processor 70 via a control and sense field of ACU 17. Decoder inputs −A−−D are address leads which specify a control point or sense point type. For example, a binary "1" (0001) sent to decoders 201 and 202 is interpreted as a WORD 1 control point, setting the decoder 200 output lead labeled −WRD1. As can be seen there are 7 output control words and therefore decoders 200, 201 recognize 7 control points. The control words will be identified later in the explanation of the operation of the CONI. The ACU 17 is further connected to the control sense decoder 290 via a bidirectional data control and sense bus C/SO–C/S3. Message data as well as other control data such as ERROR words are passed between the CONI and the peripheral processor via this bidirectional bus. Finally, write control signals, −WS, −WSEL, read control signals −RPL, RPL and enabling signals −CENX, CEN are input from ACU 17 and decoded and used to write, read and enable control words and data being transferred between the CONI and the peripheral processor 70.

Figures 6, 7:
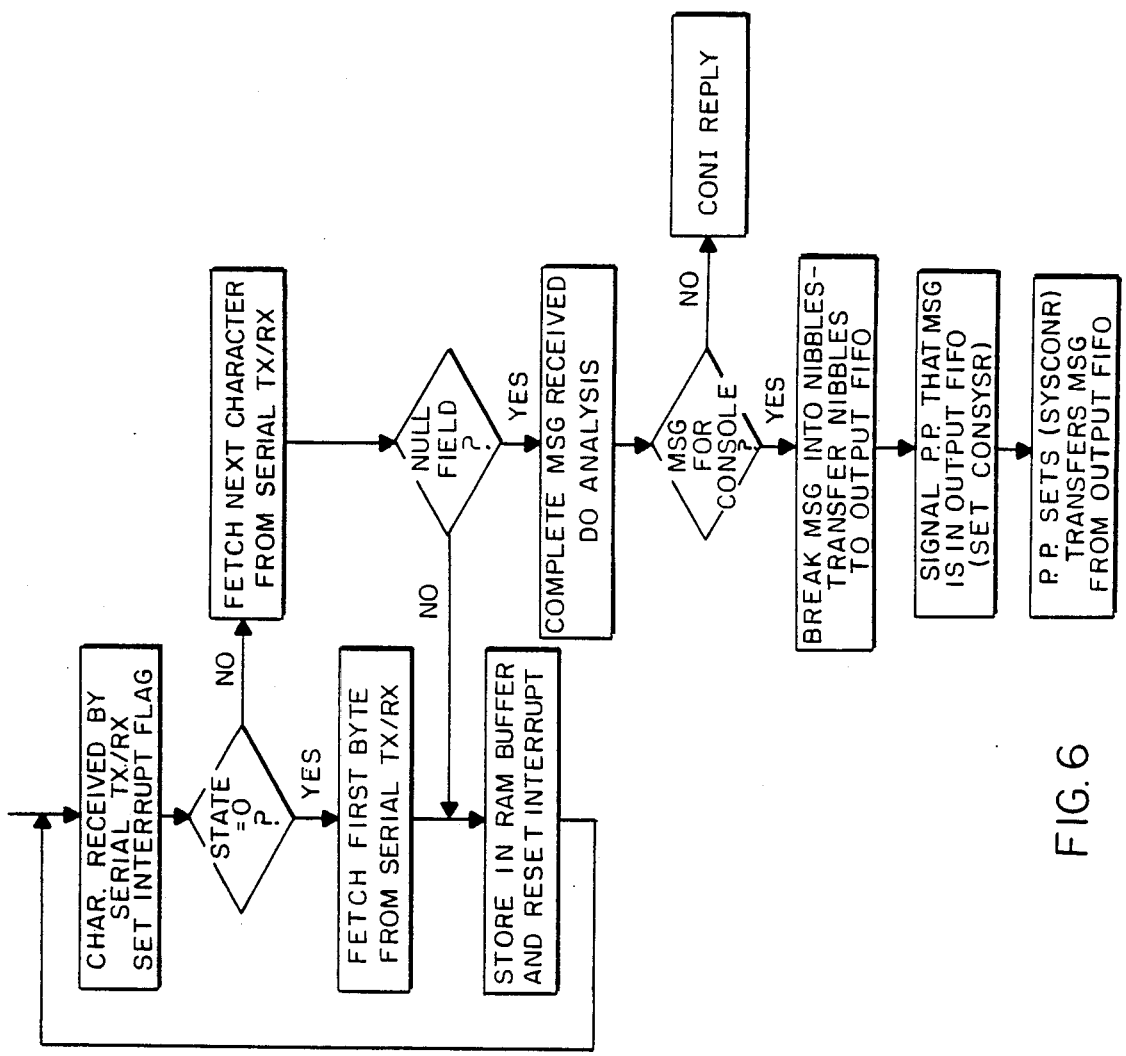
FIG. 6 is a flow chart diagram illustrating the transfer operation between the attendant console and the CENTREX network system of the present invention.
FIG. 7 is a chart showing the operation of the state machine.

Turning now to FIG. 6 of the included drawings the operating unit for handling keycodes will be explained.

This operating unit is entered when a character is received by serial Tx/Rx 240. This action causes a receive flag to be set by the serial Tx/Rx which is used to interrupt the microprocessor 210. The received character is then read from a receive data register in the serial Tx/Rx 240 by the microprocessor 210 and the operating unit enters a STATE machine. The state changes are based on the reception of the "CARRIAGE RETURN" (CR) character.

With reference to FIG. 7 an explanation of the STATE machine will now be given.

STATE 0 is the beginning of a keycode message. The first byte in the keycode message is read from the serial Tx/Rx and entered into a buffer in RAM 230. The state is then changed to STATE 1 and the routine returns from the interrupt.

STATE 1 looks at the received character of the next interrupt by serial Tx/Rx 240. If the character is a "CARRIAGE RETURN", the state is changed STATE 2 and the character is stored in the buffer. If the character is not a "CARRIAGE RETURN", the character is stored in the buffer and the state remains in STATE 1 and the routine returns from the interrupt.

STATE 2 stores the received character in the buffer and determines if it is a carriage return (the second carriage return that would signify the null field or end of message). If it is a "CARRIAGE RETURN" than the state is changed to STATE 3 otherwise, the state is changed to STATE 1 and the routine returns from the interrupt.

STATE 3 accepts the character (which is the checksum byte) and compares it to the calculated checksum for the message. If it does not compare, the state is changed to STATE 0 and all variables are cleared.

After the complete message has been received and stored in a buffer in RAM 230 the CONI performs an analysis on the message to determine the action to take on it. The keycode message that the CONI acts on are as follows:

CARRIER LOSS DETECT—the console sends this keycode upon detecting a loss of incoming carrier from the CONI on the incoming data pair. Upon reception of this keycode the CONI will send an ERROR message to the CENTREX system.

ACKNOWLEDGMENT—The console 5 sends this keycode to acknowledge a command code message that has been previously sent to it.

NO ACKNOWLEDGE—The console 5 sends this keycode indicating to the CONI that the last command message received did not pass a checksum verification at the console. The CONI will transmit the message again. If the retry is unsuccessful the CONI will send an ERROR message to the CENTREX system.

HARDWARE ERROR—The console 5 sends this keycode when it finds an error in its self-test. The CONI will report the error through an ERROR message to the CENTREX system.

All other messages are passed to the peripheral processor via the output FIFO and routines SNDFIF and CONSYSR.

With renewed reference to FIG. 6, the routine SNDFIF takes a received message byte from RAM 230 and breaks it up into two (4 bit) nibbles. It then calls routine FIFOI which transfers the nibbles into the output FIFO 270 a nibble at a time, with the most significant nibble first. This routine continues until the entire message is transferred to the output FIFO 270.

Then routine CONSYSR is entered which sets signal CONSYSR and which is passed to the peripheral processor via bus field C/S0–C/S3 of FIG. 5. Signal CONSYSR flags the peripheral processor that a message is available in the output FIFO 270. The peripheral processor than sets an interrupt signal SYSCONR indicating that a CENTREX transfer is in progress. A flag is set by the microprocessor 210 when SYSCONR is set in order to determine when SYSCONR is reset and thereby return, from the interrupt.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An operating unit for an interface circuit for transmitting data messages between a remotely located attendant console and a CENTREX equipped central office exchange, said central office exchange including an analog control unit connected to a peripheral processor, said analog control unit including a control field for sending control signals to said interface circuit, and a sense field for receiving control signals from said interface circuit and receiving data messages from said interface circuit, said operating unit comprising:

receiving means connected to said attendant console and to controller means, said receiving means arranged to receive a data message from said attendant console and set a receive signal signaling said controller means that a first byte of said data message has been received;

state machine means called by said controller means arranged to transfer said first byte to temporary memory means and reset said receive signal, said state machine means accepting all additional characters from said receiving means and storing said characters in said memory means until a character sequence is received indicating an end of data message;

analysis means called by said controller means for analyzing said received data message to ascertain the destination of said received data message;

sequential memory means connected to said sense field arranged to receive and store said data message from said memory means responsive to said analysis concluding that said data message is for said peripheral processor; and said controller means sends a control signal to said peripheral processor via said sense field indicating a data message has been stored in said sequential memory whereby, said peripheral processor sends said controller means a sequential memory read control signal over said control field indicating that it is reading said sequential memory means and resets said sequential memory read control signal signaling said controller means that the data message has been read.

2. The operating unit for an interface circuit as claimed in claim 1, wherein: said receiving means is a Universal Serial Asynchronous Receiver Transmitter (USART) and said receive signal is a receiver ready control signal output by said USART when data characters have been input into a USART receive data register.

3. The operating unit for an interface circuit as claimed in claim 1, wherein: said controller means is a microprocessor controller connected to a Read Only Memory (ROM) and said ROM stores the operating procedure for said operating unit allowing said microprocessor controller to execute said operating unit when called by said microprocessor controller.

4. The operating unit for an interface circuit as claimed in claim 3, wherein: said temporary memory means is a Random Access Memory (RAM) connected to said microprocessor controller arranged to store said receive data message in a byte format.

5. The operating unit for an interface circuit as claimed in claim 1, wherein: said data message includes a checksum bit following said end of data character sequence and said controller means calculates a checksum from the received characters of said data message and compares said checksum bit to said calculated checksum and responsive, to a comparison accepts the data message and calls said analysis means.

6. The operating unit for an interface circuit as claimed in claim 5, wherein: responsive to the calculated checksum not comparing to the data message checksum said controller means resets said interface circuit and sends said attendant console a send again data message.

7. The operating unit for an interface circuit as claimed in claim 1, wherein: wherein said end of data sequence comprises two "CARRIAGE RETURN" characters.

8. The operating unit for an interface circuit as claimed in claim 2, wherein: responsive to said analysis means ascertaining that the received data message is for the interface unit said interface unit responds by sending to said attendant console via said USART a "NO ACKNOWLEDGE" data message or to said peripheral processor via said sequential memory and said sense field an ERROR data message.

9. The operating unit for an interface circuit as claimed in claim 1, wherein: said sequential memory means is a First In First Out (FIFO) memory and said controller means transfers said data message into said FIFO from said temporary memory means a nibble (4 bits) at a time with the most significant nibble first.

10. The operating unit for an interface circuit as claimed in claim 1, wherein: said controller means does not access said sequential memory means until said peripheral processor resets said sequential memory read control signal.

* * * * *